(12) United States Patent
Lee

(10) Patent No.: US 10,355,508 B2
(45) Date of Patent: Jul. 16, 2019

(54) BATTERY MANAGEMENT METHOD, APPARATUS, AND SYSTEM

(71) Applicant: SAMSUNG ELECTRONICS CO., LTD., Suwon-si (KR)

(72) Inventor: Sun-Jae Lee, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 44 days.

(21) Appl. No.: 15/596,295

(22) Filed: May 16, 2017

(65) Prior Publication Data

US 2018/0123372 A1 May 3, 2018

(30) Foreign Application Priority Data

Oct. 27, 2016 (KR) .................. 10-2016-0141022

(51) Int. Cl.
*H02J 7/00* (2006.01)
*B60L 3/12* (2006.01)
*B60L 58/16* (2019.01)
*B60L 58/12* (2019.01)
*B60L 58/20* (2019.01)

(52) U.S. Cl.
CPC .............. *H02J 7/0068* (2013.01); *B60L 3/12* (2013.01); *B60L 58/12* (2019.02); *B60L 58/16* (2019.02); *B60L 58/20* (2019.02); *H02J 7/0013* (2013.01); *H02J 7/0021* (2013.01); *H02J 7/0031* (2013.01); *B60L 2240/12* (2013.01); *B60L 2240/547* (2013.01); *B60L 2240/549* (2013.01); *Y02T 10/7005* (2013.01)

(58) Field of Classification Search
CPC ..................................................... H02J 7/0068
USPC ............................................................ 320/128
See application file for complete search history.

(56) References Cited

U.S. PATENT DOCUMENTS

| 5,332,958 | A | * | 7/1994 | Sloan ........................ H02J 1/14 307/10.7 |
| 8,519,716 | B2 | * | 8/2013 | Kurata ............... G01R 31/3624 320/118 |
| 8,970,173 | B2 | | 3/2015 | Kelty et al. |
| 2007/0018615 | A1 | * | 1/2007 | Graf ........................ B60R 16/03 320/160 |
| 2007/0075681 | A1 | * | 4/2007 | Takagi .................. H02J 7/0016 320/128 |
| 2007/0152635 | A1 | * | 7/2007 | Hofer ..................... G01R 31/36 320/116 |
| 2009/0045779 | A1 | * | 2/2009 | Sherman ............... H02J 7/0031 320/136 |

(Continued)

FOREIGN PATENT DOCUMENTS

| JP | 9-98515 A | 4/1997 |
| JP | 2009-101983 A | 5/2009 |

(Continued)

*Primary Examiner* — Suresh Memula
(74) *Attorney, Agent, or Firm* — NSIP Law

(57) ABSTRACT

A battery management method includes recording output information associated with a discharging of a battery unit, determining output pattern information based on the recorded output information, determining an adjusted cutoff physical quantity of the battery unit based on the determined output pattern information, and changing a cutoff physical quantity of the battery unit to the adjusted cutoff physical quantity.

16 Claims, 17 Drawing Sheets

(56) References Cited

U.S. PATENT DOCUMENTS

| | | | | |
|---|---|---|---|---|
| 2009/0140698 A1* | 6/2009 | Eberhard | ............... | H02J 7/045 |
| | | | | 320/152 |
| 2010/0045236 A1* | 2/2010 | Muraoka | ........... | H01M 10/0525 |
| | | | | 320/118 |
| 2010/0188043 A1* | 7/2010 | Kelty | .................... | B60L 3/0046 |
| | | | | 320/109 |
| 2011/0169459 A1* | 7/2011 | Chen | ..................... | H02J 7/0057 |
| | | | | 320/160 |
| 2013/0257382 A1* | 10/2013 | Field | .................... | H01M 10/44 |
| | | | | 320/134 |
| 2014/0188304 A1 | 7/2014 | Richter et al. | | |
| 2014/0253042 A1* | 9/2014 | Su | ........................ | H02J 7/0031 |
| | | | | 320/134 |
| 2014/0320089 A1* | 10/2014 | Wang | ..................... | H02J 7/007 |
| | | | | 320/157 |
| 2015/0022154 A1* | 1/2015 | Kim | ..................... | H02J 7/0054 |
| | | | | 320/114 |
| 2016/0380455 A1* | 12/2016 | Greening | .............. | H02J 7/0044 |
| | | | | 320/114 |

FOREIGN PATENT DOCUMENTS

| | | |
|---|---|---|
| JP | 2012-183850 A | 9/2012 |
| JP | 2013-90451 A | 5/2013 |
| KR | 10-2016-0046631 A | 4/2016 |

\* cited by examiner

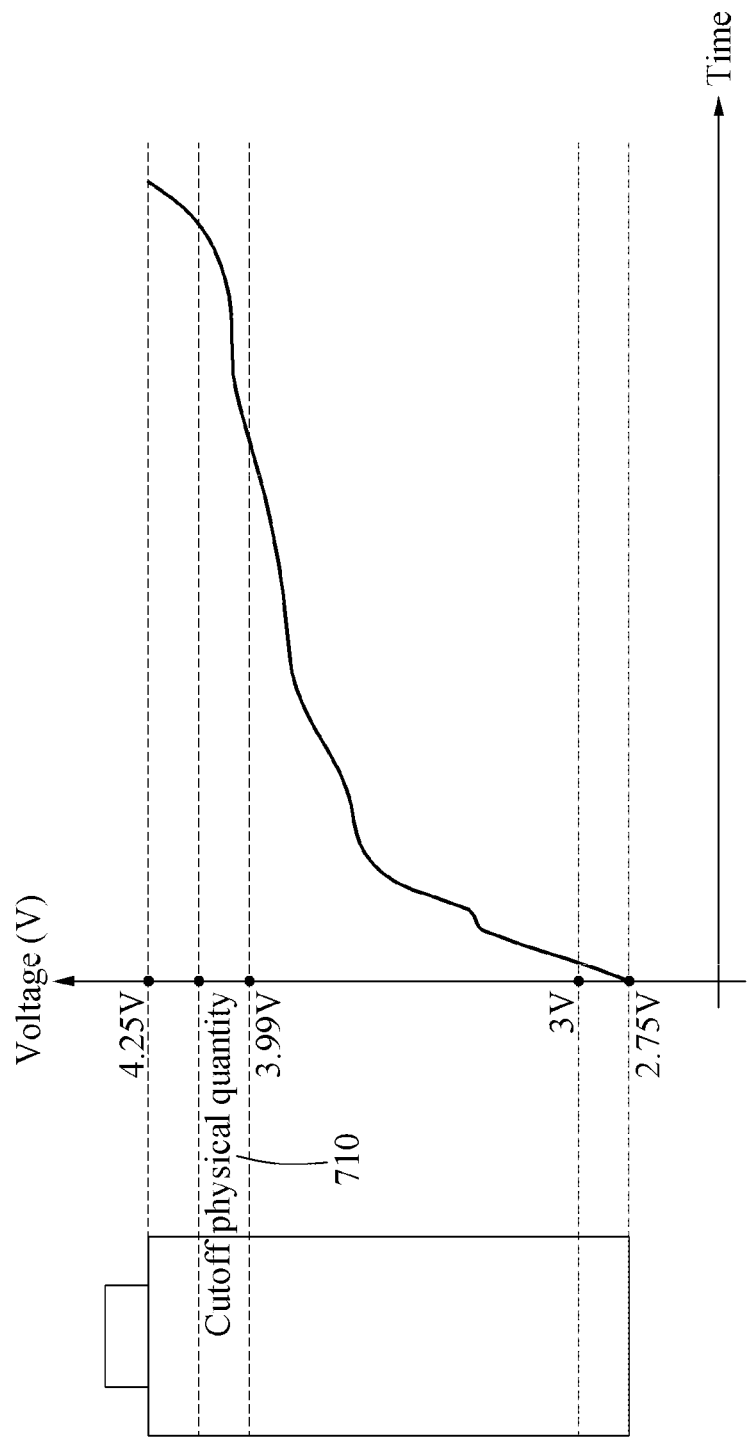

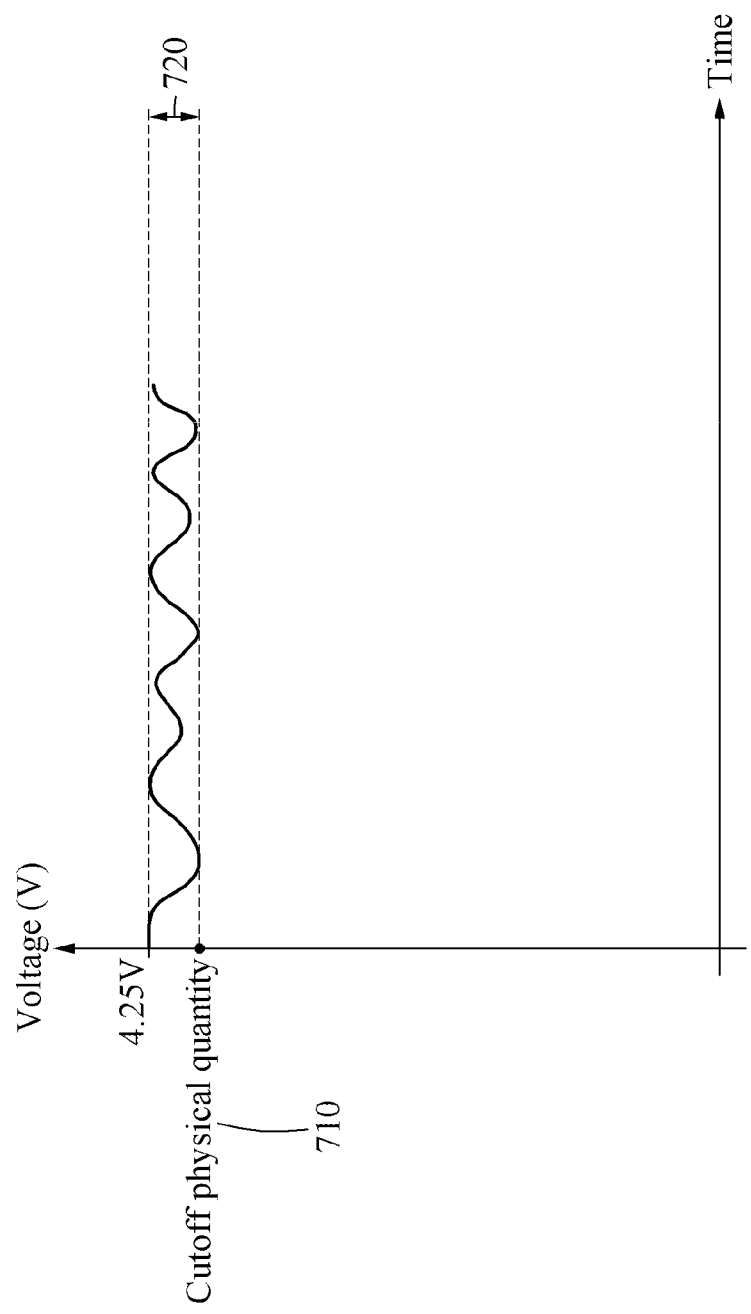

BATTERY MANAGEMENT METHOD, APPARATUS, AND SYSTEM

CROSS-REFERENCE TO RELATED APPLICATION(S)

This application claims the benefit under 35 USC § 119(a) of Korean Patent Application No. 10-2016-0141022 filed on Oct. 27, 2016, in the Korean Intellectual Property Office, the entire disclosure of which is incorporated herein by reference for all purposes.

BACKGROUND

1. Field

The following description relates to a battery management method.

2. Description of Related Art

As environmental concerns and energy resource issues become more important, electric vehicles (EV) have been highlighted as a likely primary vehicle of the future. The EV may use a battery formed in a single pack with a plurality of rechargeable and dischargeable secondary cells as a main power source. Thus, in terms of the EV, a life of the battery pack is important. The life of the battery may be prolonged according to an increase in a capacity of the battery pack. Also, an increase in the number of battery cells included in the battery pack may prolong the life of the battery pack. However, in the foregoing examples, costs for the battery pack may also increase.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of managing a battery includes recording output information associated with a discharging of a battery unit, determining output pattern information based on the recorded output information, determining an adjusted cutoff physical quantity of the battery unit based on the determined output pattern information, and changing a cutoff physical quantity of the battery unit to the adjusted cutoff physical quantity.

The output pattern information may include frequency distribution information of the recorded output information.

The determining of the adjusted cutoff physical quantity may include identifying an interval of which a frequency is substantially maximal by referencing the frequency distribution information, and determining a cutoff physical quantity corresponding to the identified interval to be the adjusted cutoff physical quantity by referencing predetermined corresponding relationship information.

The determining of the adjusted cutoff physical quantity may include selecting reference pattern information from a plurality of pieces of reference pattern information based on a similarity between the determined output pattern information and each of the plurality of pieces of reference pattern information, and determining a cutoff physical quantity corresponding to the selected reference pattern information to be the adjusted cutoff physical quantity.

The method may further include calculating a distance between the determined output pattern information and each of the plurality of pieces of reference pattern information, and determining the calculated distance to be the similarity.

The cutoff physical quantity may be a discharging cutoff voltage of the battery unit.

The method may further include determining a voltage area including a present voltage of the battery unit among a plurality of predetermined voltage areas, and displaying a graphics object of the determined voltage area, criterion information corresponding to the determined voltage area, and user requested output information on a display.

The method may further include outputting any one or any combination of two or more of a visual feedback, an auditory feedback, and a tactile feedback in response to the user requested output information being greater than the criterion information.

In another general aspect, an apparatus for managing a battery includes a memory, and a controller operably coupled to the memory, the controller being configured to record output information associated with a discharging of a battery unit in the memory, determine output pattern information based on the recorded output information, determine an adjusted cutoff physical quantity of the battery unit based on the determined output pattern information, and change a cutoff physical quantity of the battery unit to the adjusted cutoff physical quantity.

The output pattern information may include frequency distribution information of the recorded output information.

The controller may be further configured to identify an interval of which a frequency is substantially maximal by referencing the frequency distribution information, and determine a cutoff physical quantity corresponding to the identified interval to be the adjusted cutoff physical quantity by referencing predetermined corresponding relationship information.

The controller may be further configured to select reference pattern information from a plurality of pieces of reference pattern information based on a similarity between the determined output pattern information and each of the plurality of pieces of reference pattern information, and determine a cutoff physical quantity corresponding to the selected reference pattern information to be the adjusted cutoff physical quantity.

The controller may be further configured to calculate a distance between the determined output pattern information and each of the plurality of pieces of reference pattern information, and determine the calculated distance to be the similarity.

The cutoff physical quantity may be a discharging cutoff voltage of the battery unit.

The controller may be further configured to determine a voltage area including a present voltage of the battery unit among a plurality of predetermined voltage areas, and display a graphics object of the determined voltage area, criterion information corresponding to the determined voltage area, and user requested output information on a display.

The controller may be further configured to output any one or any combination of two or more of a visual feedback, an auditory feedback, and a tactile feedback in response to the user requested output information being greater than the criterion information.

In still another general aspect, a system of managing a battery includes a slave battery management apparatus configured to sense a physical quantity of a battery unit, and a master battery management apparatus operably coupled to the slave battery management apparatus, the master battery management apparatus being configured to determine state information of the battery unit based on the sensed physical quantity and adjust a cutoff physical quantity of the battery unit, to record output information of an assembly including the battery unit, to determine output pattern information based on the recorded output information, to determine an adjusted cutoff physical quantity of the battery unit, and to change the cutoff physical quantity to the adjusted cutoff physical quantity.

The output pattern information may include frequency distribution information of the recorded output information.

The master battery management apparatus may be further configured to identify an interval of which a frequency is substantially maximal by referencing the frequency distribution information, and determine a cutoff physical quantity corresponding to the identified interval to be the adjusted cutoff physical quantity by referencing predetermined corresponding relationship information.

Other features and aspects will be apparent from the following detailed description, the drawings, and the claims.

BRIEF DESCRIPTION OF THE DRAWINGS

FIGS. 7A and 7B illustrate examples of adjusting a cutoff physical quantity of a battery unit.

Figure 1:
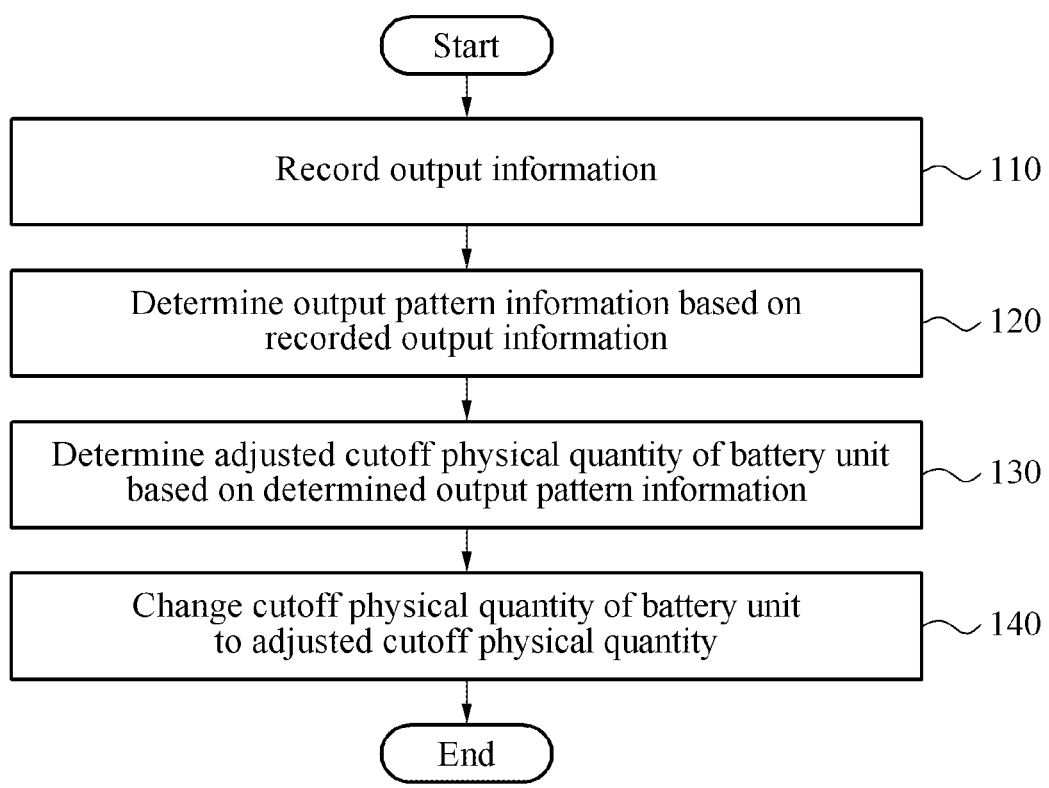
FIG. 1 illustrates an example of a battery management method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art after gaining a thorough understanding of the disclosure of this application. The sequences of operations described herein are merely examples, and are not limited to those set forth herein, but may be changed as will be apparent to one of ordinary skill in the art after gaining the understanding of the disclosure, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after gaining an understanding of the entirety of the disclosure of the application.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only, and is not to be used to limit the disclosure. As used herein, the terms "a," "an," and "the" are intended to include the plural forms as well, unless the context clearly indicates otherwise. As used herein, the terms "include, "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here to ensure both clarity and conciseness.

FIG. 1 illustrates an example of a battery management method.

The battery management method of FIG. 1 is performed by a battery management apparatus.

Referring to FIG. 1, in operation 110, the battery management apparatus records output information associated with a discharging of a battery unit. The battery unit may be a battery cell, a battery module, or a battery pack. The output information is, for example, information associated with an amount of charge supplied to a motor and/or an inverter of an electric vehicle or a hybrid vehicle.

The battery management apparatus records the output information at an interval of a preset time, for example, one second.

In operation 120, the battery management apparatus determines output pattern information based on the recorded output information. For example, the battery management apparatus is trained on the recorded output information and determines output pattern information corresponding to the recorded output information.

The output pattern information includes frequency distribution information of the recorded output information. The battery management apparatus determines the frequency distribution information. The battery management apparatus sets a range of the recorded output information using a minimal value and a maximal value of the recorded output information. For example, when the minimal value is 1 kilowatt hour (kWh) and the maximal value is 19 kWh, the battery management apparatus sets a range of 18 kWh (=19 kWh−1 kWh). The battery management apparatus, according to one or more embodiments, divides the range into a plurality of intervals in the same size. The battery management apparatus divides the range of 18 kWh into, for example, nine intervals including a first interval between 1 kWh and 3 kWh through a ninth interval between 17 kWh and 19 kWh. In this example, a class of the first interval corresponding to a first ordinal interval is the lowest and a class of the ninth interval corresponding to a last ordinal interval is the highest. The battery management apparatus maps the recorded output information to one of the plurality of intervals. The battery management apparatus counts the number of pieces of output information mapped to each of the plurality of intervals. Through this, the battery management apparatus determines the frequency distribution information of the recorded output information.

For example, the frequency distribution information is represented in Table 1. The frequency distribution information may be a frequency distribution table as shown below. The frequency distribution information may also be a frequency distribution graph, for example, a frequency distribution curve or histogram. The aforementioned forms of the frequency distribution information are merely an example and thus, a form of the frequency distribution information is not limited to the example.

TABLE 1

| Interval | Frequency |
| --- | --- |
| First interval | 7 |
| Second interval | 15 |
| Third interval | 28 |
| Fourth interval | 35 |
| Fifth interval | 42 |
| Sixth interval | 31 |
| Seventh interval | 25 |
| Eighth interval | 18 |
| Ninth interval | 11 |

In operation 130, the battery management apparatus determines an adjusted cutoff physical quantity of the battery unit based on the determined output pattern information. The battery management apparatus identifies an interval of which a frequency is maximal by referencing the frequency distribution information. In Table 1, a frequency of a fifth interval is maximal and thus, the battery management apparatus identifies the fifth interval from the plurality of intervals.

The battery management apparatus determines a cutoff physical quantity corresponding to the identified interval to be the adjusted cutoff physical quantity by referencing predetermined corresponding relationship information. The predetermined corresponding relationship information includes a plurality of pieces of interval information and information associated with a cutoff physical quantity corresponding to each of the plurality of pieces of interval information. According to an increase in the interval information, the cutoff physical quantity also increases. For example, a cutoff physical quantity corresponding to a lowest class interval is the smallest, and a cutoff physical quantity corresponding to a highest class interval is the largest.

The predetermined corresponding relationship information is represented in Table 2 below. However, the predetermined corresponding relationship information is not limited thereto.

TABLE 2

| Interval | Cutoff physical quantity (V) |
| --- | --- |
| First interval | 2.842 |
| Second interval | 2.849 |
| Third interval | 2.856 |
| Fourth interval | 2.863 |
| Fifth interval | 2.870 |
| Sixth interval | 2.877 |
| Seventh interval | 2.884 |
| Eighth interval | 2.891 |
| Ninth interval | 3.898 |

In Table 2, the battery management apparatus determines a cutoff physical quantity corresponding to the fifth interval, 2.870 volts (V) to be the adjusted cutoff physical quantity.

The battery management apparatus selects one of a plurality of pieces of reference pattern information based on a similarity between the determined output pattern information and each of the plurality of pieces of reference pattern information. The similarity is determined through a comparison between the determined output pattern information and each of the plurality of pieces of reference pattern information. The battery management apparatus selects reference pattern information corresponding to a highest similarity. The battery management apparatus determines a cutoff physical quantity corresponding to the selected reference pattern information to be the adjusted cutoff physical quantity. Related descriptions are provided with reference to FIGS. 4A through 4C.

In operation 140, the battery management apparatus changes the cutoff physical quantity of the battery unit to the adjusted cutoff physical quantity. The cutoff physical quantity of the battery unit, according to one or more embodiments is a discharging cutoff voltage of the battery unit. The battery management apparatus adjusts the discharging cutoff voltage of the battery unit.

The battery management apparatus sets a danger use range based on the adjusted cutoff physical quantity. For example, when the adjusted cutoff physical quantity is 2.870 V, the battery management apparatus sets a danger use range from 2.870 V to 3.0 V. The battery management apparatus monitors whether a physical quantity, for example, a voltage of the battery is in the danger use range. When the physical quantity of the battery unit is in the danger use range, the battery management apparatus outputs an alarming signal indicating that the physical quantity of the battery unit is in the danger use range. For example, the battery management apparatus displays a charging request signal on a display such as a dashboard of an electric vehicle.

The battery management apparatus receives requested output information from a power management system. The power management system includes, for example, an electronic control unit (ECU) of an electric vehicle and is not limited thereto. When a power request event occurs, for example, when a user accelerates the electric vehicle or when a required power of a load increases, the power management system calculates the requested output information. The power management system transmits the requested output information to the battery management apparatus. The battery management apparatus determines outputtable power information of the battery unit or an assembly, for example, a battery pack including the battery unit based on state information, for example, state of charge (SOC) information and/or state of health (SOH) information of the battery unit or the assembly.

When the requested output information is less than or equal to the outputtable power information, the battery management apparatus controls the battery unit or the assembly such that power corresponding to the requested output information is output. When the requested output information is greater than the outputtable power information, an output of the battery unit or the assembly is restricted to prevent an overdischarging of the battery unit or the assembly. Also, the battery management apparatus displays a message indicating that an output of the power corresponding to the requested output information is unavailable and/or a message indicating that a charging is required on a display.

Figure 2A:
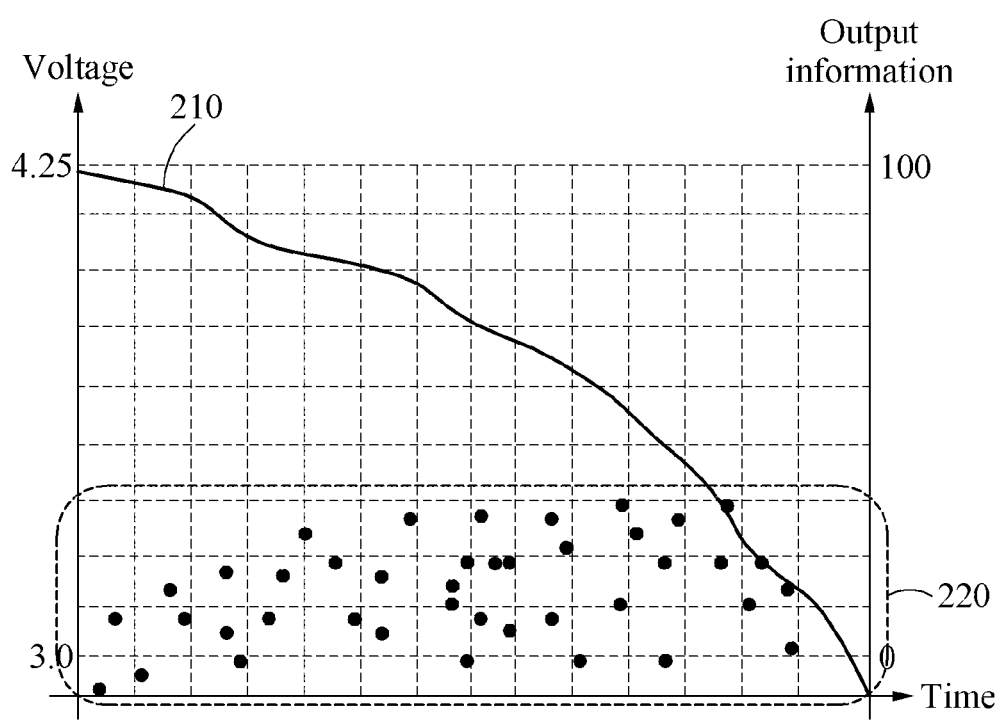
FIGS. 2A through 2C illustrate examples of distribution of output information.
Figure 2B:
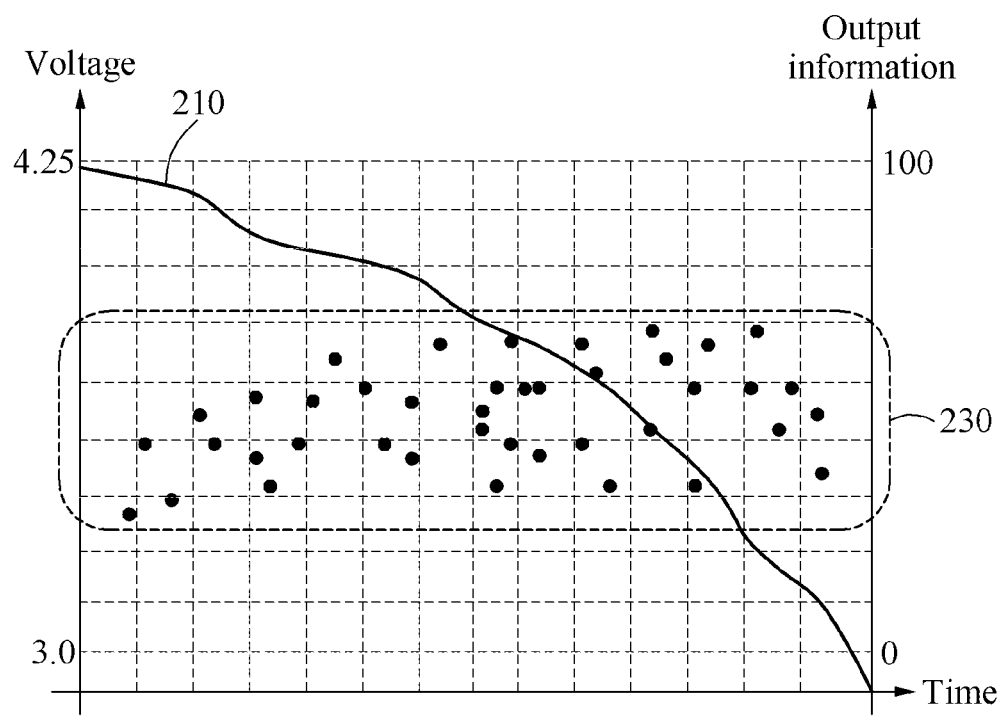
Figure 2C:
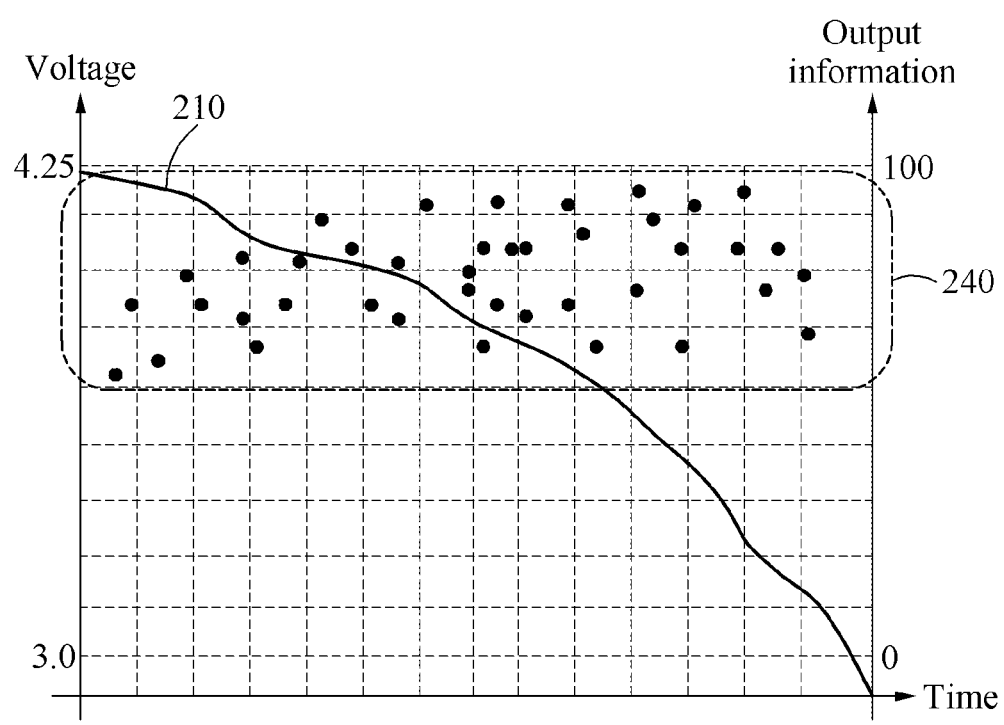

FIGS. 2A through 2C illustrate examples of distribution of output information.

FIGS. 2A through 2C illustrate a voltage 210 of a battery unit. The voltage 210 of the battery unit decreases over time. The battery unit is discharged.

FIGS. 2A through 2C also illustrate examples of distributions of output information. Hereinafter, the distribution of output information is described with reference to FIGS. 2A through 2C.

Referring to FIG. 2A, output information 220 is distributed in a low-output area. When an electric vehicle is driven at a low speed, for example, 40 kilometers per hour (km/h), the output information 220 of a battery pack is distributed as illustrated in FIG. 2A. The distribution of the output information 220 of FIG. 2A may correspond to a frequency distribution of the first interval through the third interval of Table 1.

Referring to FIG. 2B, output information 230 is distributed in an intermediate-output area. When the electric vehicle is driven at a moderate speed, for example, in a range between 40 km/h and 70 km/h, the output information 230 of a battery pack is distributed as illustrated in FIG. 2B. The distribution of the output information 230 of FIG. 2B may correspond to a frequency distribution of the fourth interval through the sixth interval of Table 1.

Referring to FIG. 2C, output information 240 is distributed in a high-output area. When the electric vehicle is driven at a high speed, for example, at least 70 km/h or radically accelerated, the output information 240 of a battery pack is distributed as illustrated in FIG. 2C. The distribution of the output information 240 of FIG. 2C may correspond to a frequency distribution of the seventh interval through the ninth interval of Table 1.

Figure 3A:
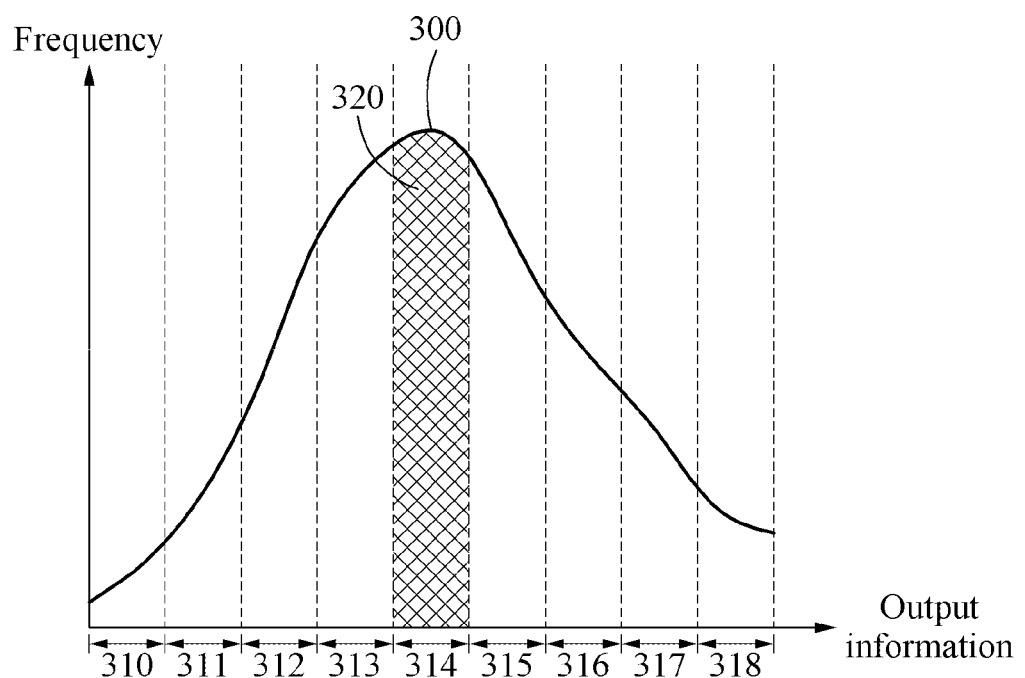
FIGS. 3A and 3B illustrate examples of output pattern information and determination of an adjusted cutoff physical quantity.
Figure 3B:
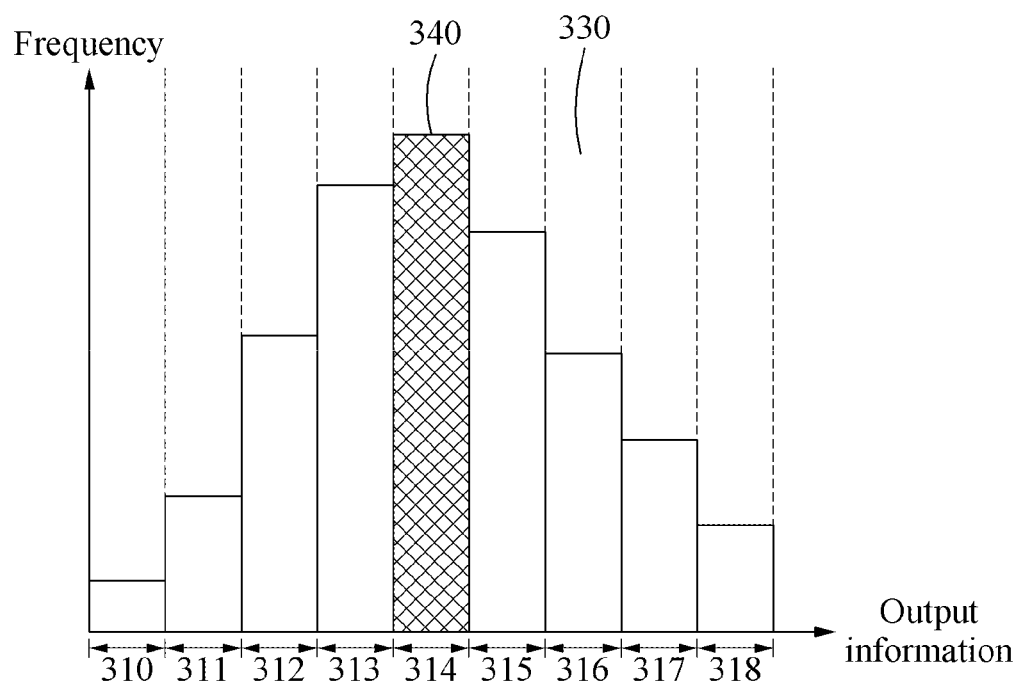

FIGS. 3A and 3B illustrate examples of output pattern information and determination of an adjusted cutoff physical quantity.

FIG. 3A illustrates an example of output pattern information. The output pattern information of FIG. 3A is represented by a frequency curve or a frequency distribution curve 300.

A battery management apparatus calculates areas corresponding to the frequency distribution curve 300 for each of a plurality of intervals 310 through 318. For example, the battery management apparatus calculates an area 320 indicated by cross-hatching lines with respect to the interval 314. Similarly, the battery management apparatus calculates areas corresponding to the intervals 310, 311, 312, 313, 315, 316, 317, and 318, respectively. The battery management apparatus identifies an interval corresponding to a maximal area. Also, the battery management apparatus identifies an interval of which a frequency is maximal. In FIG. 3A, the area 320 is a maximal area and thus, the battery management apparatus identifies the interval 314.

The battery management apparatus determines a cutoff physical quantity corresponding to the interval 314 to be an adjusted cutoff physical quantity by referencing predetermined corresponding relationship information.

FIG. 3B illustrates another example of output pattern information. The output pattern information of FIG. 3B is represented by a histogram 330.

The battery management apparatus calculates areas of bar graphs of the plurality of intervals 310 through 318 and identifies an interval corresponding to a maximal area. Also, the battery management apparatus identifies an interval of which a frequency is maximal. In FIG. 3B, an area 340 is a maximal area and thus, the battery management apparatus identifies the interval 314.

The battery management apparatus determines a cutoff physical quantity corresponding to the interval 314 to be an adjusted cutoff physical quantity by referencing predetermined corresponding relationship information.

Figure 4A:
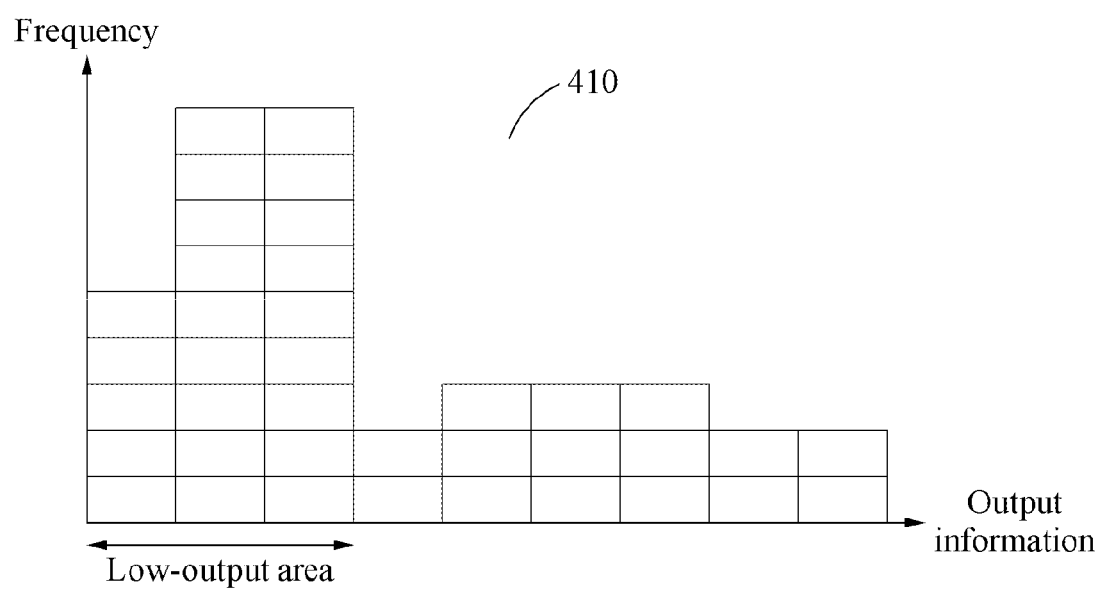
FIGS. 4A through 4C illustrate examples of determining an adjusted cutoff physical quantity by comparing a plurality of pieces of reference pattern information and output pattern information.
Figure 4B:
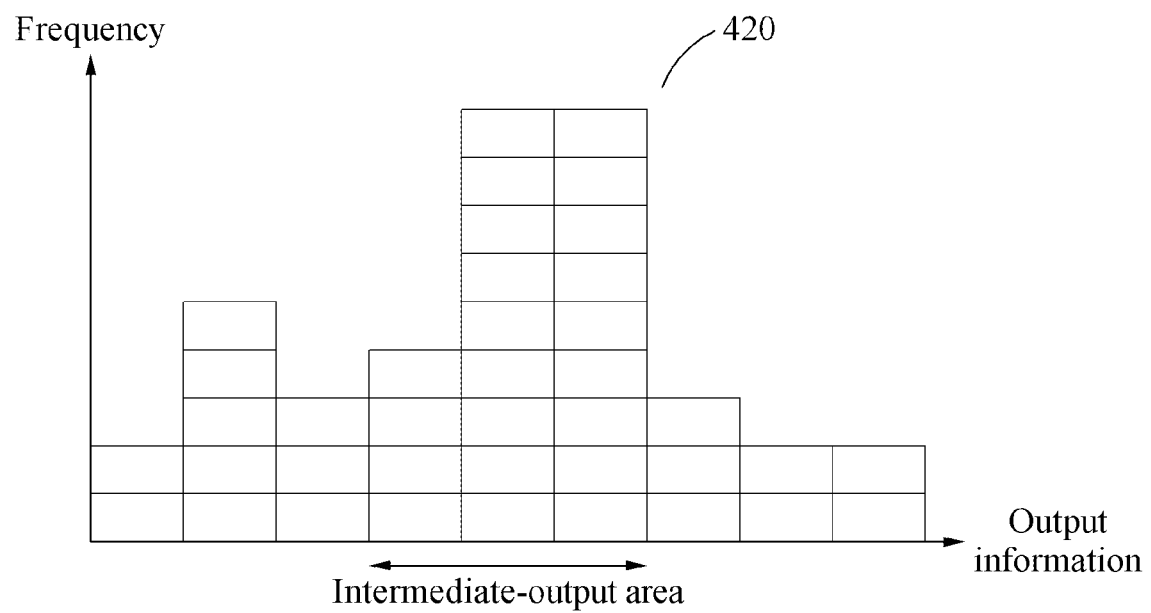
Figure 4C:

FIGS. 4A through 4C illustrate examples of determining an adjusted cutoff physical quantity by comparing a plurality of pieces of reference pattern information and output pattern information.

Referring to FIG. 4A, a great portion of first reference pattern information 410 is distributed in a low-output area.

Referring to FIG. 4B, a great portion of second reference pattern information 420 is distributed in an intermediate-output area.

Referring to FIG. 4C, a great portion of third reference pattern information 430 is distributed in a high-output area.

In FIGS. 4A through 4C, a plurality of pieces of reference pattern information, for example, the first reference pattern information 410, the second reference pattern information 420, and the third reference pattern information 430 are represented by histograms. However, a form that represents the plurality of pieces of reference pattern information is not limited thereto. Also, although FIGS. 4A through 4C illustrate three pieces of reference pattern information as an example, the number of pieces of reference pattern information is not limited to the example.

A battery management apparatus determines a similarity between each of the plurality of pieces of reference pattern information and output pattern information determined based on recorded output information. The battery management apparatus determines the similarity by, for example, calculating a distance between histograms. The battery management apparatus determines the similarity by calculating a difference or distance between a histogram of the output pattern information and a histogram of each of the plurality of pieces of reference pattern information. The distance includes, for example, a Euclidean distance or a Bhattacharyya distance. However, the distance is not limited to the aforementioned types.

The battery management apparatus selects reference pattern information most similar to the output pattern information from the plurality of pieces of reference pattern information. When output information is distributed as illustrated in FIG. 2A, the output pattern information is the most similar to the first reference pattern information 410. In this example, the battery management apparatus selects the first reference pattern information 410. When the output information is distributed as illustrated in FIG. 2B, the output pattern information is the most similar to the second reference pattern information 420. In this example, the battery management apparatus selects the second reference pattern information 420. When the output information is distributed as illustrated in FIG. 2C, the output pattern information is the most similar to the third reference pattern information 430. In this example, the battery management apparatus selects the third reference pattern information 430.

The battery management apparatus determines a cutoff physical quantity corresponding to the selected reference pattern information to be an adjusted cutoff physical quantity. For example, the battery management apparatus determines the cutoff physical quantity corresponding to the selected reference pattern information to be the adjusted cutoff physical quantity with reference to Table 3 as below.

TABLE 3

| Reference pattern information | Cutoff physical quantity (V) |
| --- | --- |
| First reference pattern information | 2.849 |
| Second reference pattern information | 2.870 |
| Third reference pattern information | 2.891 |

Figure 5:
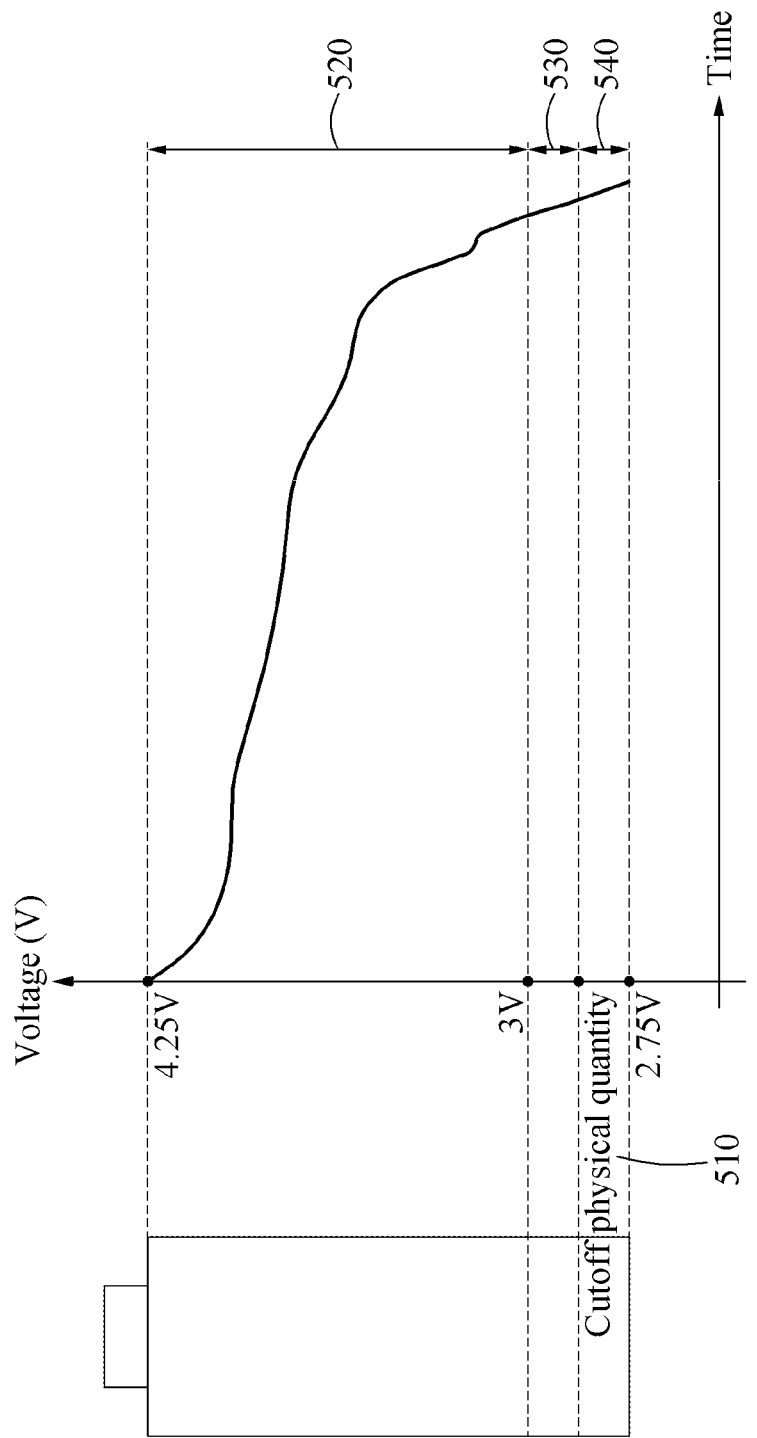
FIG. 5 illustrates an example of adjusting a cutoff physical quantity of a battery unit.

FIG. 5 illustrates an example of adjusting a cutoff physical quantity of a battery unit.

FIG. 5 illustrates a cutoff physical quantity 510 and a plurality of ranges 520, 530, and 540.

The cutoff physical quantity 510 is, for example, a discharging cutoff voltage. The cutoff physical quantity 510 is not limited to the example.

In each of the plurality of ranges 520, 530, and 540, a usage of a battery unit is associated with a life of the battery unit. For example, a speed of degradation of the battery unit is relatively high in a case in which the battery unit is used in the range 530 or the range 540 in comparison to a case in which the battery unit is used in the range 520. Also, the speed of degradation of the battery unit is relatively high in a case in which the battery unit is used in the range 540 in comparison to a case in which the battery unit is used in the range 530. When the battery unit is continually used in the range 540, the life of the battery unit may be reduced from a predicted life.

The battery management apparatus analyzes a use pattern of a user and determines the cutoff physical quantity 510 based on the analyzed use pattern. The battery management apparatus increases or reduces the cutoff physical quantity 510 based on the output pattern information.

When the output pattern information has a low-output pattern, the battery management apparatus reduces the cutoff physical quantity 510. A usage capacity of the battery unit is interconnected with the range 520, the range 530, and the range 540. For example, the range 530 increases according to a decrease in the cutoff physical quantity 510 (i.e., the voltage of the cutoff physical quantity 510 is reduced to a lower voltage) In other words, the battery may be discharged for a longer period of time before reaching the cutoff physical quantity 510. In this example, the usage capacity of the battery unit beneficially increases in comparison to a usage capacity determined before the cutoff physical quantity 510 is reduced. Also, the life of the battery unit may be prolonged. Thus, when the output pattern information has the low-output pattern, the cutoff physical quantity 510 is adjusted to decrease such that the user uses the battery unit for a longer period of time (both in the instantaneous or short-term use—e.g. miles, kilometers, or hours; and the long-term re-usability—e.g. number of recharge cycles or years of use).

When the output pattern information has a high-output pattern, the battery management apparatus increases the cutoff physical quantity 510 which effectively reduces the instantaneous use duration before an alarm or recharge is required. When a high-output event occurs, for example, when the user radically accelerates an electric vehicle, the life degradation speed of the battery increases (in other words, the long-term battery life degrades more quickly) in comparison to a case in which the high-output event does not occur. In response to an increase in the cutoff physical quantity 510, the battery management apparatus outputs an alarming signal associated with a current state of the battery unit at shorter intervals. Also, depending on examples, when the voltage of the battery unit is close to the increased cutoff physical quantity 510 and the high-output event occurs, the battery management apparatus restricts an output of the battery unit (for example by limiting current, duty cycle, disconnecting the battery unit, or deactivating load). Thus, when the output pattern information has the high-output pattern, the cutoff physical quantity 510 is adjusted to increase such that the user uses the battery unit for a longer period of time (i.e. without sacrificing recharging cycles or without premature long-term degradation of the battery's functionality).

Figure 6A:
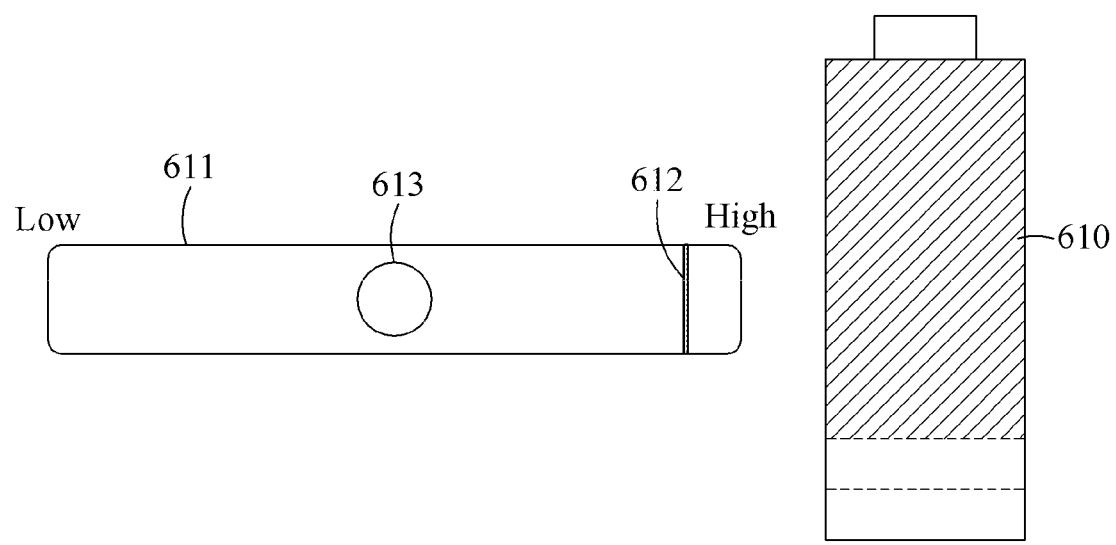
FIGS. 6A through 6C illustrate examples of a user interface.
Figure 6B:
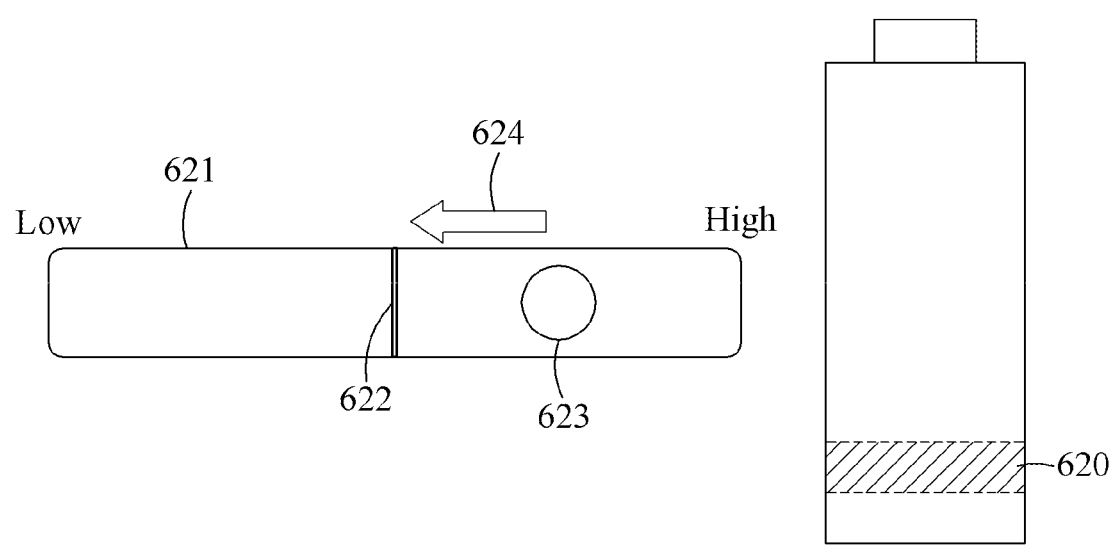
Figure 6C:
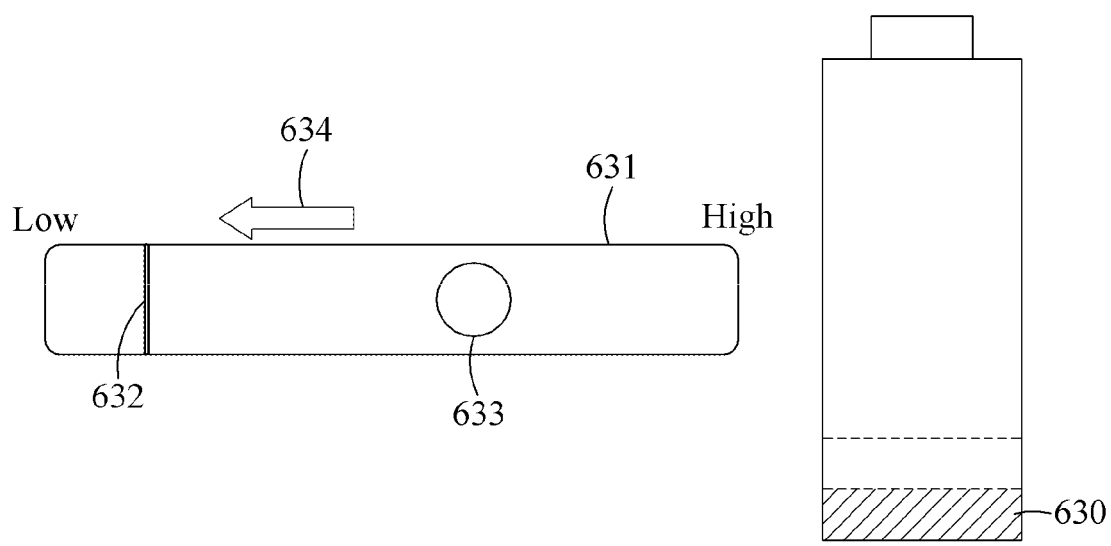

FIGS. 6A through 6C illustrate examples of a user interface.

FIG. 6A illustrates a graphics object 611 corresponding to a range 610 corresponding to or based (at least in part) upon a voltage of a battery unit, criterion information 612 corresponding to the range 610, and user requested output information 613.

In the graphics object 611, a direction from "High" to "Low" indicates a decrease in a voltage or an amount of charge of the battery unit. In an example of FIG. 6A, the user requested output information 613 is less than the criterion information 612. The criterion information 612, in one or more embodiments, is based on information on power usage which is set to maintain a maximum (or substantially optimized) life of the battery unit in the range 610.

A battery management apparatus sets a background and a boundary between the graphics object 611 and the background and/or a background based on color information corresponding to the range 610. For example, the battery management apparatus sets the boundary and/or the background to green.

FIG. 6B illustrates a graphics object 621 corresponding to a range 620 including a voltage of a battery unit, criterion information 622 corresponding to the range 620, and user requested output information 623. The criterion information 622 is information on power set to maintain a maximum life of the battery unit in the range 620.

In an example of FIG. 6B, the user requested output information 623 is greater than the criterion information 622. The user requested output information 623 being continually or even repeatedly in an area higher than an area including the criterion information 622 negatively affects the life of the battery unit. When the user requested output information 623 is greater than the criterion information 622, the battery management apparatus displays a visual feedback 624 on a display. The visual feedback 634, according to an embodiment, is proportional to the amount and/or duration that the user requested output information 623 exceeds the criterion information 622. For example, the visual feedback 634 may be extended longitudinally, featured more prominently, or incorporate a strobing pattern to indicate a relative magnitude of the departure from the criterion information 622. Also, depending on embodiments, the battery management apparatus outputs an auditory feedback and/or a tactile feedback corresponding to the visual feedback 624. The battery management apparatus operates such that the battery unit is usable for a longer period of time in the range 620 while avoiding long-term degradation of the battery capacity.

The battery management apparatus sets a background and a boundary between the graphics object 621 and the background and/or a background based on color information corresponding to the range 620. For example, the battery management apparatus sets the boundary and/or the background to green.

FIG. 6C illustrates a graphics object 631 corresponding to a range 630 including a present voltage of a battery unit, criterion information 632 corresponding to the range 630, and user requested output information 633. The criterion information 632, according to one or more embodiments, is information on power usage which is adaptively set to maintain a maximum life of the battery unit in the range 630.

In an example of FIG. 6C, the user requested output information 633 is greater than the criterion information 632. The user requested output information 633 being continually in an area higher than an area including (or bounded on a high side by) the criterion information 632 may significantly affect the long-term life of the battery unit. When the user requested output information 633 is greater than the criterion information 632, the battery management apparatus outputs at least one of a visual feedback 634, an auditory feedback, and/or a tactile feedback. The battery management apparatus operates such that the battery unit is used for a longer period of time in the range 630 (in other words, the point at which the battery is exhausted is extended).

The battery management apparatus sets a background and a boundary between the graphics object 631 and the background and/or a background based on color information corresponding to the range 630. For example, the battery management apparatus sets the boundary and/or the background to green.

FIGS. 7A and 7B illustrate examples of adjusting a cutoff physical quantity of a battery unit.

Referring to FIG. 7A, a voltage of a battery unit increases. In other words, the battery unit is charged.

A battery management apparatus adjusts a cutoff physical quantity 710 based on a charging pattern of the battery unit. The cutoff physical quantity 710 is, according to one or more embodiments, but is not limited to, a charging cutoff voltage. Referring to FIG. 7B, the charging pattern of the battery unit is formed in a range 720. In this example, a long-term life degradation speed of the battery unit increases in comparison to a case in which the charging pattern of the battery unit is formed in a range between 3 V and 3.99 V. The battery management apparatus determines an adjusted cutoff physical quantity of the battery unit based on the charging pattern. When the charging pattern is formed as illustrated in FIG. 7B, the battery management apparatus adjusts the cutoff physical quantity 710 to be decreased. In other words, the battery management apparatus adaptively adjusts the battery charging to employ a lower voltage. In one embodiment, if the voltages of the battery unit reach the decreased cutoff physical quantity 710 during a discharging, the battery management apparatus outputs a message indicating that a charging is available. Through this, the charging pattern is changed, which, beneficially, prolongs a life of the battery unit.

Figure 8:
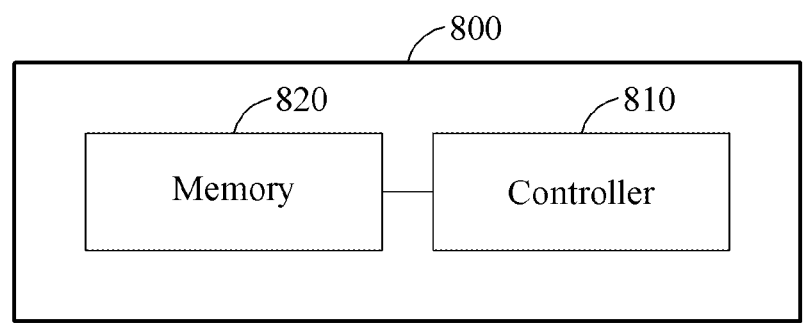
FIG. 8 illustrates an example of a battery management apparatus.

FIG. 8 illustrates an example of a battery management apparatus.

Referring to FIG. 8, a battery management apparatus 800 includes a controller 810 and a memory 820 which is operably coupled to the controller 810 to allow for retrieval and storage of data, instructions, battery models, and usage pattern data.

The controller 810 records output information associated with a discharging of a battery unit into the memory 820. The controller 810 senses an output power of an assembly, for example, a battery pack including the battery unit and stores the sensed output information in the memory 820. Depending on examples, the controller 810 senses an output or a charging power of the battery unit and stores the sensed output power in the memory 820.

The controller 810 determines output pattern information based on the recorded output information. The controller 810 determines output pattern information of the assembly. Depending on embodiment, the controller 810 determines output pattern information of the battery unit.

The controller 810 determines an adjusted cutoff physical quantity of the battery unit based on the determined output pattern information.

The controller 810 changes a cutoff physical quantity of the battery unit to the adjusted cutoff physical quantity. Through this, a charging cutoff voltage and/or a discharging cutoff voltage of the battery unit is adaptively adjusted.

The controller 810 receives requested output information from a power management system. When a voltage of the battery unit is in, approaches, or exceeds (depending upon embodiment) a range which is set based on the adjusted cutoff physical quantity, for example, the range 540 of FIG. 5, the controller 810 controls the battery unit or the assembly such that power corresponding to criterion information of the set range is output. The controller 810 operates to prevent an output of the power corresponding to the requested output information. Through this, an output of the battery unit or the assembly is controlled or restricted despite a request for the power and thus, an overdischarging of the battery unit is prevented. However, in emergency situations, a user may be able to override the restriction to achieve the requested output power.

The controller 810 counts the number of pieces of output information included in a danger use range of the battery unit. A lower limit value of the danger use range may be the adjusted cutoff physical quantity. The danger use range is, for example, a voltage range between 4 V and 4.25 V of the battery unit. When a proportion of the number of pieces of output information is greater than or equal to a predetermined proportion, for example, when a proportion of the counted number to the total number of pieces of output information recorded during a predetermined time is at least one third, the controller 810 determines to restrict the output of the battery unit or the assembly. When a voltage corresponding to the requested output information is included in the danger use range, the controller 810 controls the battery unit or the assembly such that power corresponding to the danger use range is output. The power corresponding to the danger use range may be less than the power corresponding to the requested output information. Through this, the battery unit or the assembly is prevented from radically outputting a large amount of power, and a life degradation speed of the battery unit of the assembly is not increased drastically.

Since the descriptions of FIGS. 1 through 7 are also applicable here, repeated description of FIG. 8 will be omitted for clarity and conciseness.

Figure 9:
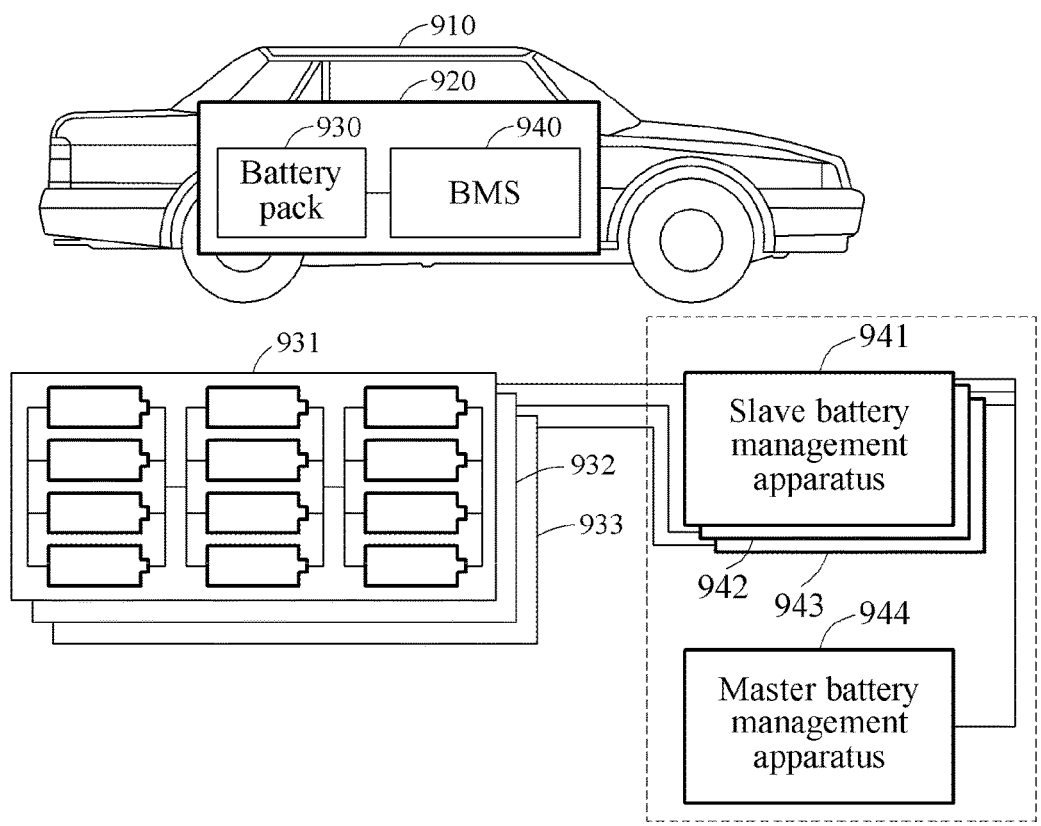
FIG. 9 illustrates an example of a battery management system.

FIG. 9 illustrates an example of a battery management system.

FIG. 9 illustrates a vehicle 910. The vehicle 910 is, for example, an electric vehicle, a hybrid vehicle, or a plug-in hybrid electric vehicle.

A battery system 920 includes a battery pack 930, and a battery management system (BMS) 940 operably coupled to the battery pack 930.

The battery pack 930 includes a plurality of battery modules 931, 932, and 933. Each of the plurality of battery modules 931, 932, and 933 includes a plurality of battery cells.

The BMS 940 includes a master battery management apparatus 944 and the plurality of slave battery management apparatuses 941, 942, and 943. Each of the plurality of slave battery management apparatuses 941, 942, and 943 performs substantially the same operation and thus, the following description is provided based on the slave battery management apparatus 941.

The slave battery management apparatus 941 collects physical quantity information of each of the plurality of battery cells in the battery module 931. The physical quantity information includes, for example, at least one of voltage information, current information, temperature information, and/or impedance information. The slave battery management apparatus 941 transmits the collected physical quantity information to the master battery management apparatus 944. For example, the slave battery management apparatus 941 uses a controller area network (CAN) communication to transmit the collected physical quantity information to the master battery management apparatus 944.

The master battery management apparatus 944 determines state information of a battery cell, the battery module 931, 932, or 933, and/or the battery pack 930 based on the collected physical quantity information. The state information includes, for example, an SOC and/or an SOH.

The master battery management apparatus 944 records output information associated with a discharging of a battery cell. The output information associated with the battery cell includes output information associated with an output power of the battery pack 930, and is not limited thereto. The output information associated with the discharging of the battery cell includes information on an output power of the battery cell or the plurality of battery modules 931, 932, and 933. The master battery management apparatus 944 senses the output power of the battery pack 930 during a predetermined period of time. The master battery management apparatus 944 records the sensed output power.

The master battery management apparatus 944 determines an output pattern information of the battery pack 930 based on the recorded output information. The master battery management apparatus 944 determines an adjusted cutoff physical quantity of the battery cell based on the determined output pattern information. The master battery management apparatus 944 changes a cutoff physical quantity of the battery cell to the adjusted cutoff physical quantity. For example, the master battery management apparatus 944 changes a setting value for a cutoff voltage of a protection circuit of the battery cell.

When the output pattern information has a low-output pattern, the master battery management apparatus 944 adjusts a discharging cutoff physical quantity of the battery cell to be lower than a preset cutoff physical quantity of the battery cell. In this example, a usage capacity of the battery cell is greater than a usage capacity verified before an adjustment. Also, a desired power may be output using a relatively small number of battery cells. Through this, the number of battery cells included in the battery pack may be reduced and thus, costs for the battery pack may also be reduced.

The master battery management apparatus 944 receives requested output information from a power management system for example, an ECU in the vehicle 910. The requested output information includes information on power calculated by the power management system when a user steps on an accelerator of the vehicle 910, for example, a power command value. The master battery management apparatus 944 determines outputtable power information of the battery pack 930 based on state information, for example, an SOC or an SOH of the battery pack 930.

When the requested output information is less than or equal to the outputtable power information, the master battery management apparatus 944 controls the battery pack 930 such that power corresponding to the requested output information is output. The output power of the battery pack 930 is transferred to an inverter in the vehicle 910. The inverter converts the output power and transfers the converted power to an electric motor.

When the requested output information is greater than the outputtable power information, the master battery management apparatus 944 controls the battery pack 930 such that power corresponding to the outputtable power information is output. Also, the master battery management apparatus 944 displays a message indicating that an output of the power corresponding to the requested output information is unavailable and/or a message indicating that a charging is required on a display.

Depending on examples, the BMS 940 may be included in a high-capacity storage device such as an energy storage system (ESS). The BMS 940 may also be included in a device management system or an electric device including a rechargeable battery.

Since the descriptions of FIGS. 1 through 8 are also applicable here, repeated description of FIG. 9 will be omitted for clarity and conciseness.

The apparatuses, units, modules, devices, and other components described herein are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent after gaining a thorough understanding of the disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of managing a battery, the method comprising:
   recording output information associated with a discharging of a battery unit;
   determining output pattern information based on the recorded output information, wherein the output pattern information comprises frequency distribution information of the recorded output information;
   determining an adjusted cutoff physical quantity of the battery unit based on the determined output pattern information; and
   changing a cutoff physical quantity of the battery unit to the adjusted cutoff physical quantity.

2. The method of claim 1, wherein the determining of the adjusted cutoff physical quantity comprises:
   identifying an interval of which a frequency is substantially maximal by referencing the frequency distribution information; and
   determining a cutoff physical quantity corresponding to the identified interval to be the adjusted cutoff physical quantity by referencing predetermined corresponding relationship information.

3. The method of claim 1, wherein the determining of the adjusted cutoff physical quantity comprises:
   selecting reference pattern information from a plurality of pieces of reference pattern information based on a similarity between the determined output pattern information and each of the plurality of pieces of reference pattern information; and
   determining a cutoff physical quantity corresponding to the selected reference pattern information to be the adjusted cutoff physical quantity.

4. The method of claim 3, further comprising:
   calculating a distance between the determined output pattern information and each of the plurality of pieces of reference pattern information; and
   determining the calculated distance to be the similarity.

5. The method of claim 1, wherein the cutoff physical quantity is a discharging cutoff voltage of the battery unit.

6. The method of claim 1, further comprising:
   determining a voltage area comprising a present voltage of the battery unit among a plurality of predetermined voltage areas; and
   displaying a graphics object of the determined voltage area, criterion information corresponding to the determined voltage area, and user requested output information on a display.

7. The method of claim 6, further comprising:
   outputting any one or any combination of any two or more of a visual feedback, an auditory feedback, or a tactile feedback in response to the user requested output information being greater than the criterion information.

8. An apparatus for managing a battery, the apparatus comprising:
a memory; and
a controller operably coupled to the memory, the controller configured to
record output information associated with a discharging of a battery unit in the memory,
determine output pattern information based on the recorded output information, wherein the output pattern information comprises frequency distribution information of the recorded output information,
determine an adjusted cutoff physical quantity of the battery unit based on the determined output pattern information, and
change a cutoff physical quantity of the battery unit to the adjusted cutoff physical quantity.

9. The apparatus of claim 8, wherein the controller is further configured to:
identify an interval of which a frequency is substantially maximal by referencing the frequency distribution information, and
determine a cutoff physical quantity corresponding to the identified interval to be the adjusted cutoff physical quantity by referencing predetermined corresponding relationship information.

10. The apparatus of claim 8, wherein the controller is further configured to:
select reference pattern information from a plurality of pieces of reference pattern information based on a similarity between the determined output pattern information and each of the plurality of pieces of reference pattern information, and
determine a cutoff physical quantity corresponding to the selected reference pattern information to be the adjusted cutoff physical quantity.

11. The apparatus of claim 10, wherein the controller is further configured to:
calculate a distance between the determined output pattern information and each of the plurality of pieces of reference pattern information, and
determine the calculated distance to be the similarity.

12. The apparatus of claim 8, wherein the cutoff physical quantity is a discharging cutoff voltage of the battery unit.

13. The apparatus of claim 8, wherein the controller is further configured to:
determine a voltage area including a present voltage of the battery unit among a plurality of predetermined voltage areas, and
display a graphics object of the determined voltage area, criterion information corresponding to the determined voltage area, and user requested output information on a display.

14. The apparatus of claim 13, wherein the controller is further configured to:
output any one or any combination of any two or more of a visual feedback, an auditory feedback, or a tactile feedback in response to the user requested output information being greater than the criterion information.

15. A system of managing a battery, the system comprising:
a slave battery management apparatus configured to sense a physical quantity of a battery unit; and
a master battery management apparatus operably coupled to the slave battery management apparatus and configured to:
determine state information of the battery unit based on the sensed physical quantity and adjust a cutoff physical quantity of the battery unit,
record output information of an assembly including the battery unit,
determine output pattern information based on the recorded output information, wherein the output pattern information comprises frequency distribution information of the recorded output information,
determine an adjusted cutoff physical quantity of the battery unit, and
change the cutoff physical quantity to the adjusted cutoff physical quantity.

16. The system of claim 15, wherein the master battery management apparatus is further configured:
to identify an interval of which a frequency is substantially maximal by referencing the frequency distribution information, and
to determine a cutoff physical quantity corresponding to the identified interval to be the adjusted cutoff physical quantity by referencing predetermined corresponding relationship information.

* * * * *